United States Patent
Lin (10) Patent No.: US 8,391,598 B2
(45) Date of Patent: Mar. 5, 2013

(54) METHODS FOR PERFORMING LOCAL TONE MAPPING

(75) Inventor: Peng Lin, Pleasanton, CA (US)

(73) Assignee: Aptina Imaging Corporation, George Town (KY)

( * ) Notice: Subject to any disclaimer, the term of this patent is extended or adjusted under 35 U.S.C. 154(b) by 240 days.

(21) Appl. No.: 12/985,310

(22) Filed: Jan. 5, 2011

(65) Prior Publication Data

US 2012/0170843 A1   Jul. 5, 2012

(51) Int. Cl.
*G06K 9/00* (2006.01)
(52) U.S. Cl. .......................... 382/167; 382/162; 382/260
(58) Field of Classification Search .................. 382/162, 382/167, 260, 263, 264; 345/102, 204, 214, 345/690; 250/208.1; 358/1.9, 3.01; 348/272, 348/597, 231.3
See application file for complete search history.

(56) References Cited

U.S. PATENT DOCUMENTS

| 7,068,396 | B1 * | 6/2006 | Gallagher et al. ........... 358/3.01 |
| 7,643,035 | B2 | 1/2010 | Toyama |
| 8,169,431 | B2 * | 5/2012 | Kerofsky ...................... 345/214 |
| 8,179,363 | B2 * | 5/2012 | Kerofsky ...................... 345/102 |
| 8,223,113 | B2 * | 7/2012 | Kerofsky ...................... 345/102 |
| 2009/0041376 | A1 | 2/2009 | Carletta |
| 2010/0104178 | A1 | 4/2010 | Tamburrino |
| 2010/0157078 | A1 | 6/2010 | Atanassov |

* cited by examiner

*Primary Examiner* — Anh Hong Do
(74) *Attorney, Agent, or Firm* — Treyz Law Group; G. Victor Treyz; Nancy Y. Ru (57) ABSTRACT

Adaptive local tone mapping may be used to convert a high dynamic range image to a low dynamic range image. Tone mapping may be performed on an on a Bayer domain image. A high dynamic range image may be filtered to produce a luminance signal. An illumination component of the luminance signal may be compressed. A reflectance component of the luminance signal may be sharpened. After the luminance signal has been processed, it may be used in producing an output image in the Bayer domain that has a lower dynamic range than the input image. The output Bayer domain image may be demosaiced to produce an RGB image. Tone-mapping may be performed with a tone-mapping processor.

20 Claims, 4 Drawing Sheets

METHODS FOR PERFORMING LOCAL TONE MAPPING

BACKGROUND

The present invention relates to tone mapping images, and more particularly, to adaptive local tone mapping high dynamic range images to low dynamic range images.

Images with a high dynamic range have a high luminance ratio between the brightest and darkest object in a scene, while images with a low dynamic range have a low luminance ratio.

When high dynamic range images are displayed on low dynamic range devices, the captured high dynamic range of the image must be compressed to the available range of the display device. This is commonly called tone mapping.

Tone mapping methods include global tone mapping and local tone mapping. Global tone mapping methods apply the same mapping function to all pixels. While global tone mapping methods provide computationally simple solutions, they often result in loss of contrast and detail. Local tone mapping methods use a spatially varying mapping function determined by the neighborhood of a pixel, which allows an increase in the local contrast and the visibility of some details of an image. Local tone mapping methods usually yield more pleasing results because human vision is more sensitive to local contrast. However, conventional local tone mapping methods may result in halo artifacts around bright areas, and increases in computation resources.

It may therefore be desirable to have improved methods for local tone mapping.

DETAILED DESCRIPTION

Real-world scenes often have a very high dynamic range as compared to captured images. Dynamic range is the luminance ratio between the brightest and the darkest object in a scene. Typically, cameras and other imaging devices capture images having a dynamic range that is smaller than that of real world scenes. It may therefore be difficult to capture good images of scenes that have regions with high contrast, such as scenes that have portions in bright sunlight and portions in shadow.

Recently, imaging devices have been developed that capture high dynamic range images (HDR). An image may be considered to have a "high" dynamic range if it has a dynamic range that is higher relative to other images. High dynamic range (HDR) images may also refer to images that have been processed to increase the dynamic range. For example, high dynamic range images may be captured by a digital camera using a multi-exposure method. In such a method, multiple images of the same scene may be captured at different exposure settings. A low-exposure image may better capture details of brightly lit portions of the scene, while a high-exposure image may better capture details of dark portions of the scene. The multiple images may be combined into a composite image that resolves the brightly lit as well as the dark portions of the image.

High dynamic range images that may have a contrast ratio such as 250,000:1. However, often it is desired to display these images on a low dynamic display device such as an LCD monitor. A typical LCD monitor may have a contrast ratio of 1,000:1. Tone-mapping methods are used to compress the high dynamic range of a captured image to the low dynamic range of a display device. "High" and "low" may be relative terms when describing dynamic range. Tone-mapping methods may be used to convert any input image into an output image that has a lower dynamic range than that of the input image. For example, tone-mapping may be used to convert a "low" dynamic range image into an image that has an even lower dynamic range. In the context of tone-mapping, an input image may be described as a high dynamic range image while an output image may be described as a low dynamic range image.

Figure 1:
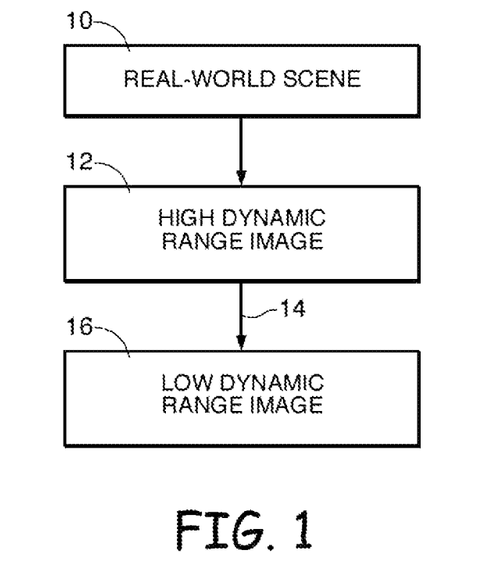
FIG. 1 is a diagram of a real-world scene that may be captured as a high dynamic range image and tone-mapped to a low dynamic range image in accordance with an embodiment of the present invention.

As shown in FIG. 1, a real-world scene 10 may be captured as a high dynamic range image 12. Tone-mapping 14 may be performed to convert high dynamic range image 12 into low dynamic range image 16 that may be displayed on a low dynamic range display device. Images 12 and 16 may be still images or video.

Figure 2:
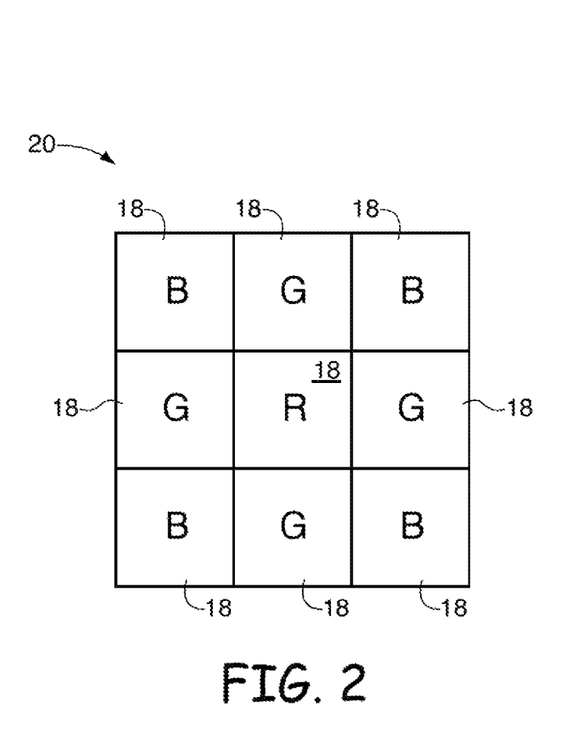
FIG. 2 is a diagram of a Bayer color filter array in accordance with an embodiment of the present invention.

Image sensors in digital cameras and other digital imaging devices typically have an array of pixels. Each pixel may have an associated color filter of, for example, red, green, or blue. A typical color filter array that may be used for an array of pixels is shown in FIG. 2. Color filter array 20 of FIG. 2 has red, green, and blue pixels 18 arranged such that half the pixels are green, a quarter of the pixels are red, and a quarter of the pixels are blue. A color filter array with the pattern shown in FIG. 2 may be known as a Bayer filter.

In the color filter array 20 of FIG. 2, each pixel 18 is associated with one color. An image obtained using pixel array 20 may be said to be a Bayer domain image, or an image having a Bayer representation. After a Bayer domain image is captured by an image sensor having a color filter array 20, a process known as demosaicing may be performed on the capture image. During demosaicing, color information may be interpolated between pixels such that each pixel position is associated with all three colors. For example, "blue" values for the positions at green pixels may be obtained by interpolating the values received by blue pixels on either side of a particular green pixel. Each pixel in a demosaiced image would have associated values for red (R), green (G), and blue (B). A demosaiced image may be known as an RGB image, an image in an RGB domain, or an image in an RGB representation.

Conventionally, tone-mapping is performed in an RGB domain. However, tone-mapping an image represented in RGB may be computationally expensive because three values are associated with each pixel. It may be desirable to perform tone-mapping on a Bayer domain image before the Bayer domain image is converted to an RGB domain image.

Figure 3:
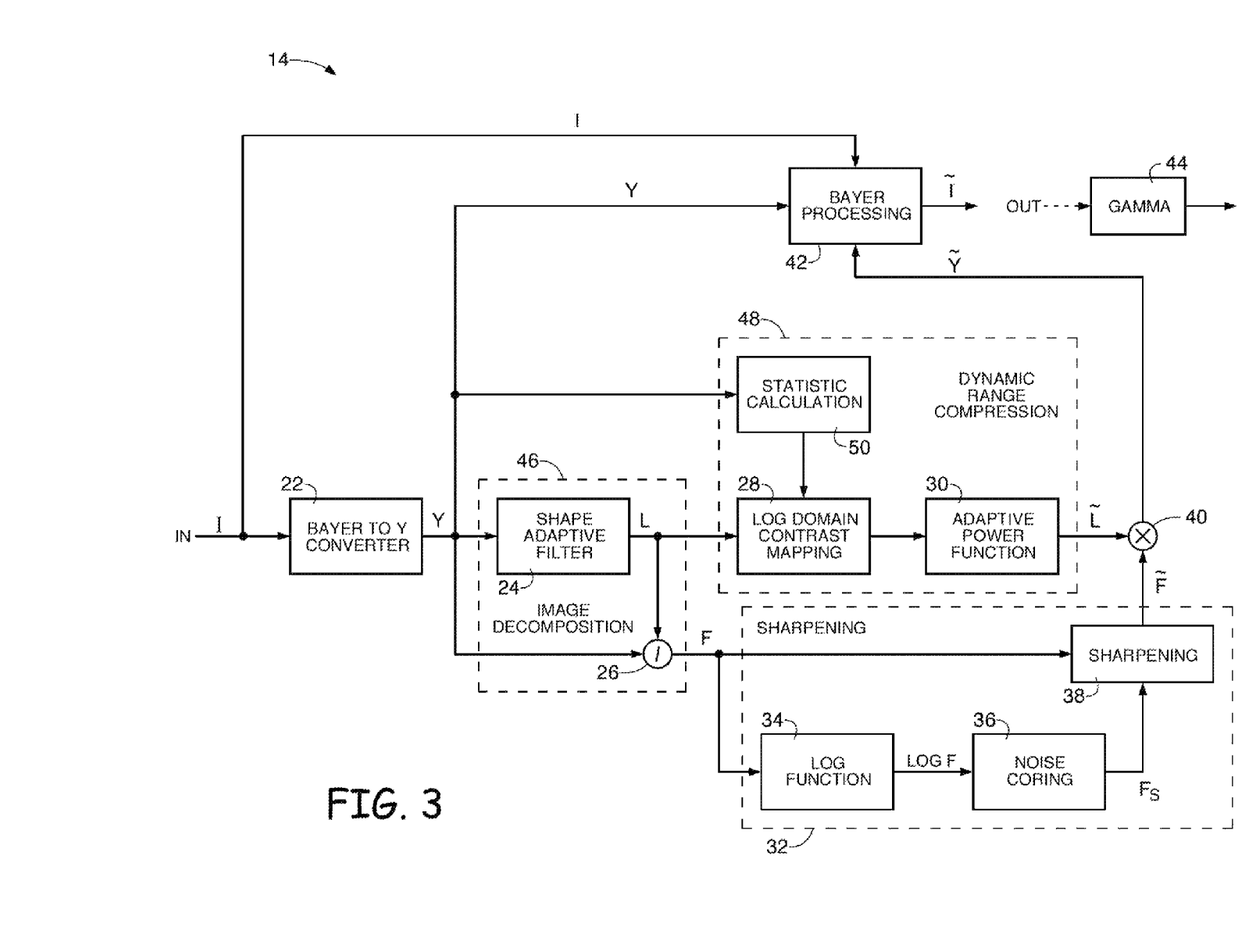
FIG. 3 is a diagram of a method for adaptive local tone-mapping images in accordance with an embodiment of the present invention.

FIG. 3 is a diagram of an adaptive local tone mapping method that may be performed on a Bayer domain image. In the diagram of FIG. 3, input image I may be an image that is captured by a camera. Input image I may be referred to as a captured image or a high dynamic range image. Image I may be present at input in on the left-hand side of FIG. 3. Image I may be a Bayer image that is represented in a Bayer domain. Image I may be known as I(x, y) where (x, y) mark the locations of individual pixels. Image I may be represented as a matrix. A value for the brightness of either red, green, or blue may be stored at each pixel location.

Image input image I may have an associated dynamic range. The dynamic range of input image I may be represented as $[0,M_{in}]$. Input image I may have any suitable dynamic range. For example, input image I may have a dynamic range of 20 bits so that $M_{in}$=1,048,575. If desired, input image I may have a dynamic range of, e.g., 20 bits or more, 15 bits or more, 10 bits or more, 15-25 bits, etc.

The local tone-mapping method of FIG. 3 may produce a tone-mapped image Ĩ at output out. Tone-mapped image Ĩ may be a Bayer domain image having an associated dynamic range that is less than the dynamic range of input image I. The dynamic range of output image I may be represented as $[0,M_{out}]$, such that $M_{in} \geq M_{out}$. Output image Ĩ may have a dynamic range that is less than the dynamic range of input image I. For example, output image Ĩ may have a dynamic range of 10 bits, so that $M_{out}$=1023. If desired, output image Ĩ may have a dynamic range of e.g., 10 bits or less, 15 bits or less, 20 bits or less, 10-15 bits, 5-15 bits, etc. Output image Ĩ may be referred to as a low dynamic range image.

In the local tone-mapping method of FIG. 3, a luminance Y(x, y) may be generated from input image I(x, y). Luminance Y(x, y) may have a value for each (x, y) location that represents brightness. Luminance Y(x, y) may also be known as luma or as a luminance signal. Luminance Y(x, y) may have values that are represented in luma. Luma may be a measure of brightness that is represented in bits. For example, luma values for luminance Y(x, y) may have values in a range of $[0,M_{in}]$. Luminance Y(x, y) may be represented as a matrix.

Luminance Y(x, y) may be processed to produce tone-mapped luminance Ŷ(x, y). Tone-mapped luminance Ŷ(x, y) may have a dynamic range that is the desired output dynamic range. Input image I(x, y) may then be multiplied by the ratio of Ŷ(x, y)/Y(x, y) to produce tone-mapped image Ĩ(x, y), as indicated by step 42 of FIG. 3. Tone-mapped luminance Ŷ(x, y) may be referred to as a modified or processed luminance. Tone-mapped luminance Ŷ(x, y) may have values in a range of $[0,M_{out}]$.

Luminance Y(x, y) may be calculated in step 22 of FIG. 3. When calculating luminance Y(x,y), the value for each (x, y) pixel location may be taken not only from the corresponding (x, y) location in input image I(x, y), but may have contributions from neighboring pixel locations. A luminance filter such as luminance filter h may be used:

$$h = \begin{bmatrix} -1 & 3 & -6 & 3 & -1 \\ 3 & 4 & 2 & 4 & 3 \\ -6 & 2 & 44 & 2 & -6 \\ 3 & 4 & 2 & 4 & 3 \\ -1 & 3 & -6 & 3 & 1 \end{bmatrix} / 64 \qquad (1)$$

Luminance Y(x, y) may be calculated by convolving h with input image I(x, y):

$$Y(x,y)=h*I(x,y) \qquad (2)$$

If desired, other suitable luminance filters h may be used. The convolution of luminance filter h with input image I(x, y) may smooth variations in I(x, y) that are on the scale of individual pixels. The application of luminance filter h input image I(x, y) may be similar to the application of a low-pass filter to input image I(x, y). Luminance filter h may aid in reducing noise.

Luminance Y(x, y) may be decomposed into an illumination component L(x, y) and a reflectance component F(x, y), as shown in image decomposition step 46 of FIG. 3. Illumination component L(x, y) and reflectance component F(x, y) may be related by:

$$Y(x,y)=L(x,y) \cdot F(x,y) \qquad (3)$$

Illumination L(x,y) may contain less image detail and be referred to as a smooth component, whereas reflectance F(x, y) may contain more image detail and be referred to as a textured component. According to Retinex theory, illumination component L may represent the incident light in an image.

Illumination component L may be calculated from luminance signal Y(x, y) by using a filter such as shape adaptive filter $H_\sigma$, as shown in step 24 of FIG. 3. Shape adaptive filter $H_\sigma$ may have the form:

$$H_\sigma(Y(x,y)) = \frac{\sum_{x_i,y_i \in W} \omega(x_i,y_i) \cdot Y(x_i,y_i)}{\sum_{x_i,y_i \in W} \omega(x_i,y_i)} \qquad (4)$$

For each (x, y) location, the summations are taken over neighboring pixels $(x_i,y_i)$ in a window W centered at pixel (x, y). Filter weights $\omega(x_i, y_i)$ may be defined as:

$$\omega(x_i,y_i) = \begin{cases} w_1, & \text{if } |Y(x_i,y_i) - Y(x,y)| < c_1\sigma \\ w_2, & \text{if } c_1\sigma \leq |Y(x_i,y_i) - Y(x,y)| < c_2\sigma \\ w_3, & \text{if } c_2\sigma \leq |Y(x_i,y_i) - Y(x,y)| < c_3\sigma \\ 0, & \text{otherwise} \end{cases} \qquad (5)$$

where $\sigma$ is a filter strength; and $c_1$, $c_2$, $c_3$, $w_1$, $w_2$ and $w_3$ are parameters. Suitable values may be, e.g., $c_1$=1, $c_2$=2, $c_3$=4, and $w_1$=4, $w_2$=2, $w_3$=1, and 5×5 for the size of the filter window W. Other suitable values for the parameters and window sizes may also be used.

Shape adaptive filter $H_\sigma$ weighs neighboring pixels $(x_i, y_i)$ more heavily that are similar to center pixel (x, y). The degree of similarity that is required between the neighboring pixels $(x_i, y_i)$ and the center pixel (x, y) is controlled by filter strength $\sigma$. If filter strength $\sigma$ is small, only very similar pixels are considered. A filter strength such as $\sigma=(M_{in}+1)/16$ may be used. It may be desirable to have a filter strength $\sigma$ that is suitable for removing small image structures while retaining high-contrast edges. By preserving high-contrast edges, shape adaptive filter $H_\sigma$ may help to prevent halo artifacts.

Shape adaptive filter $H_\sigma$ may be a generalized sigma-filter. Shape adaptive filter $H_\sigma$ may be a bilateral filter with an especially strong filtering effect. Illumination component L(x, y) is the result of applying shape adaptive filter $H_\sigma$ to luminance Y(x, y):

$$L(x,y)=H_\sigma(Y(x,y)) \qquad (6)$$

Reflectance F can then be computed with the following equation:

$$F(x,y)=Y(x,y)/L(x,y) \qquad (7)$$

The computation of reflectance F(x, y) is indicated by step 26 of FIG. 3.

Illumination component L(x, y) and reflectance component F(x, y) may then be separately processed. Illumination may be processed in dynamic range compression step 48 of FIG. 3, to produce processed illumination $\tilde{L}$(x, y). Reflectance F(x, y) may be processed in the sharpening step 32 of FIG. 3, to produce processed reflectance $\tilde{F}$(x,y). Processed illumination $\tilde{L}$(x, y) and processed reflectance $\tilde{F}$(x, y) may then be recombined in step 40 of FIG. 3 to produce tone-mapped luminance $\tilde{Y}$(x, y).

The dynamic range of the illumination component L(x, y) may be compressed in dynamic range compression step 48 of FIG. 3. Log domain contrast mapping may be performed in signal L as shown in step 28 of FIG. 3.

$$\bar{L}(x, y) = \frac{\log_2(L(x, y) + L_r + \theta * L(x, y)) - \log_2(L_{min} + L_r + \theta * L(x, y))}{\log_2(L_{max} + L_r + \theta * L(x, y)) - \log_2(L_{min} + L_r + \theta * L(x, y))} \quad (8)$$

where $L_r$=key*$L_a$, $L_{min}$ is the "minimum value" of L, $L_{max}$ is the "maximum value" of L, and θ is a parameter with $0 \leq \theta \leq 2.0$.

$L_a$ is the log average of L defined as following:

$$L_a = 2^{\sum \log_2 L(x,y)/(W*H)} \quad (9)$$

where the summation in equation (10) is taken over the entire image. To control the noise level in low light case, $L_a$ may be clipped as $L_a$=max(lowlight_noise, $L_a$) with lowlight_noise=4 for default.

The image key may be used to dynamically control the brightness of the tone mapped image, and is defined as $$\text{key} = \frac{k_1}{L_a + \frac{L_{max} - L_{min}}{k_0}} \quad (10)$$

Image key constants $k_1$ and $k_2$ may be chosen to be, e.g., $k_1$=2048.0, $k_0$=128.0.

The log domain contrast mapping parameters $L_{min}$ and $L_{max}$ should be computed from a histogram to avoid video flickering, in cases where the input images is video, as shown by statistic calculation step 50 of FIG. 3. Non-uniform bins with end-points $(i/N)^{3/2}*M_{in}$ may be used for the histogram calculation. $L_{min}$ may be chosen as the 0.01 percentile of the histogram, and is further modified as $L_{min}$=max(0,$L_{min}$−dark_floor), with dark_floor=32. $L_{max\,0}$ may be chosen as the 99 percentile of the histogram, and $L_{max}$ may be obtained from $L_{max\,0}$ according to the following: $L_{max}$=min($M_{in}$, max(bright_floor,max_factor*$L_{max\,0}$)), where parameters bright_floor and max_factor may be chosen to be bright_floor=8192 and max_factor=2.0.

To further remove video flickering, a damping function may be applied as following:

$$L_{min\_current}=L_{min\_previous}+\text{damper}*(L_{min\_current}-L_{min\_previous}) \quad (11)$$

$$L_{min\_current}=L_{min\_previous}+\text{damper}*(L_{min\_current}-L_{min\_previous}) \quad (12)$$

where damping control parameter damper may be chosen as damper=c/frm_rate.

After applying the log domain contrast mapping function, an adaptive power function may be applied as shown in step 30 of FIG. 3 to further enhance image contrast. The following power function may be applied:

$$\tilde{L}(x,y)=M_{out}\cdot\bar{L}(x,y)^{[(1-L(x,y)/M_{in})\gamma_0 + (L(x,y)/M_{in})\gamma_1]} \quad (13)$$

where $0<\gamma_0\leq 1$, and $\gamma_1>0$ are contrast control parameters for image dark region and bright region, respectively. Choosing gamma parameter $\gamma_0$ closer to zero may brighten very dark regions; and choosing gamma parameter $\gamma_1$ closer to or greater than one may make very bright regions less bright. Typical values for $\gamma_0$ (called lo_gamma) and $\gamma_1$ (called hi_gamma) may be $\gamma_0$=0.6 and $\gamma_1$=1.0. Other suitable values may be used if desired.

Image sharpening may be performed on reflectance F as shown in block 32 of FIG. 3. A sharpening signal $F_s$ may be calculated using log function step 34 and noise coring step 36. Sharpening signal $F_s$ may then be used to sharpen reflectance F in step 38.

In log function step 34, a logarithm function may be applied to reflectance F to produce log F(x, y). In noise coring step 36, a coring parameter η may be applied:

$$F_s(x, y) = \begin{cases} 0, & \text{if } |\log F(x, y)| \leq \eta \\ \log F(x, y) - \eta, & \text{if } \log F(x, y) > \eta \\ \log F(x, y) + \eta, & \text{if } \log F(x, y) < -\eta \end{cases} \quad (14)$$

where coring parameter η may be in the range of $0<\eta<0.5$. Noise coring step 36 may aid in reducing noise levels.

Coring parameter η may be chosen based on noise levels of a particular image. For example, for a image that is formed from two exposures, coring parameter η may be chosen as:

$$\eta = \begin{cases} \eta_0, & \text{if } L(x, y) < T_0 \\ \eta_1, & \text{if } T_0 < L(x, y) < T_1 \\ \eta_2, & \text{otherwise} \end{cases} \quad (15)$$

where [$T_0$,$T_1$] may cover the transition band of the smooth combination of the two exposure images. Typical values may be $\eta_0$=0.1, $\eta_1$=0.15 and $\eta_2$=0.2. Other suitable values may be used if desired.

Figure 4:
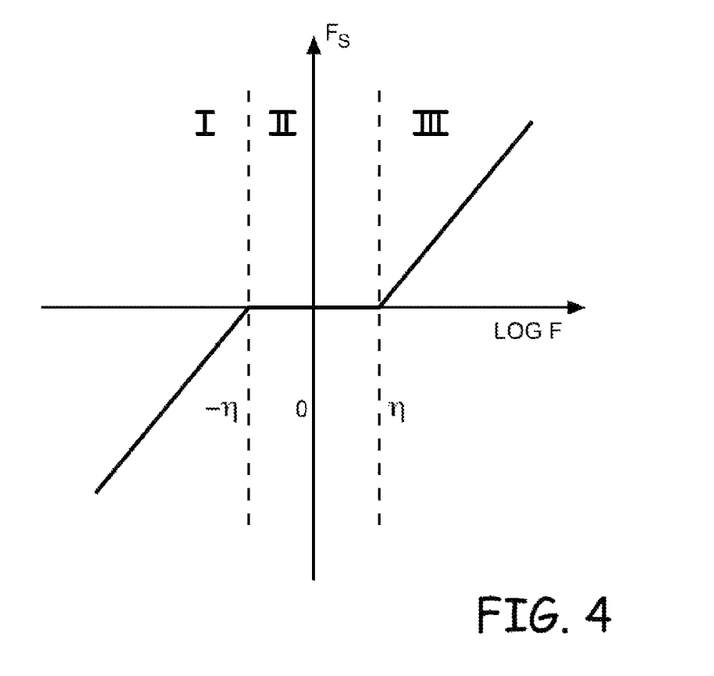
FIG. 4 is a diagram showing a sharpening signal $F_s$, plotted against the logarithm of a reflectance component F in accordance with an embodiment of the present invention.

FIG. 4 is a graph of sharpening signal $F_s$, plotted against log F. In region II, where log F(x, y)≦η, $F_s$=0. In region III, where log F(x, y)>η, η is added to log F(x,y). In region I, where log F(x, y)<−η, η is subtracted from log F(x, y).

Figure 5:
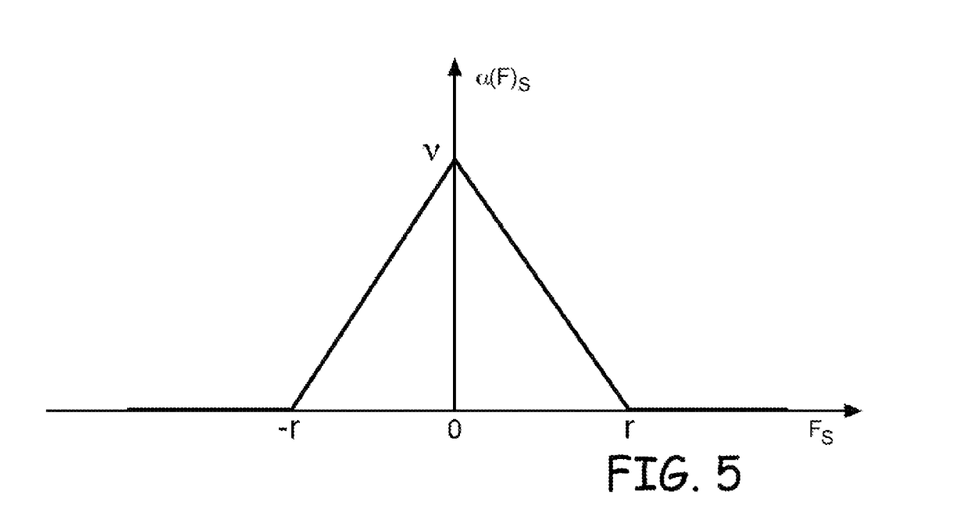
FIG. 5 is a diagram of showing a sharpening strength $\alpha(F_s)$ plotted against sharpening signal $F_s$ in accordance with an embodiment of the present invention.

In sharpening step 38 of FIG. 2, sharpening signal $F_s$ may be used to sharpen reflectance F to produce processed reflectance $\tilde{F}$:

$$\tilde{F}(x,y)=F(x,y)+\alpha(F_s)\cdot F_s \quad (16)$$

where $\alpha(F_S)$ is a sharpening strength:

$$\alpha(F_s(x, y)) = \begin{cases} v\cdot(r-|F_s(x, y)|)/r, & \text{if } |F_s(x, y)| \leq r \\ 0, & \text{otherwise} \end{cases} \quad (17)$$

where the parameter v>0 controls the magnitude of the sharpening and 0<r<1 controls the range of the sharpening. Typical values may be: v=1.0 and r=0.5. Other suitable values may be used if desired. FIG. 5 is a graph of sharpening strength $\alpha(F_s)$ as a function of $F_s$.

In image reconstruction step 40 of FIG. 3, processed illumination component $\tilde{L}$ and processed reflectance component $\tilde{F}$ are recomposed by multiplication to generate the processed luminance signal $\tilde{Y}$:

$$\tilde{Y}(x,y)=\tilde{L}(x,y)\cdot\tilde{F}(x,y) \quad (18)$$

Processed illumination signal $\tilde{L}$ may also be known as a modified illumination signal or as a compressed illumination signal.

In Bayer processing step 42 of FIG. 3, input Bayer domain image I may be processed using Y and $\tilde{Y}$ to produce signal $\tilde{I}$:

$$\tilde{I}(x,y)=[I(x,y)/Y(x,y)]\cdot \tilde{Y}(x,y) \qquad (19)$$

input image I may be divided by luminance Y and multiplied by tone-mapped luminance $\tilde{Y}$.

In gamma step 44 of FIG. 3, a gamma function may be applied to output Bayer domain image $\tilde{I}$ A gamma value for step 44 may be chosen to correspond to values for lo_gamma and hi_gamma that were used in adaptive power function step 30. For example, a gamma value of gamma=0.8 may be used in step 44 that may correspond to lo_gamma=0.6 and hi_gamma=1.0.

Output Bayer domain image $\tilde{I}$ may be demosaiced to produce an RGB image. The RGB image may be sent to a display.

Figure 6:
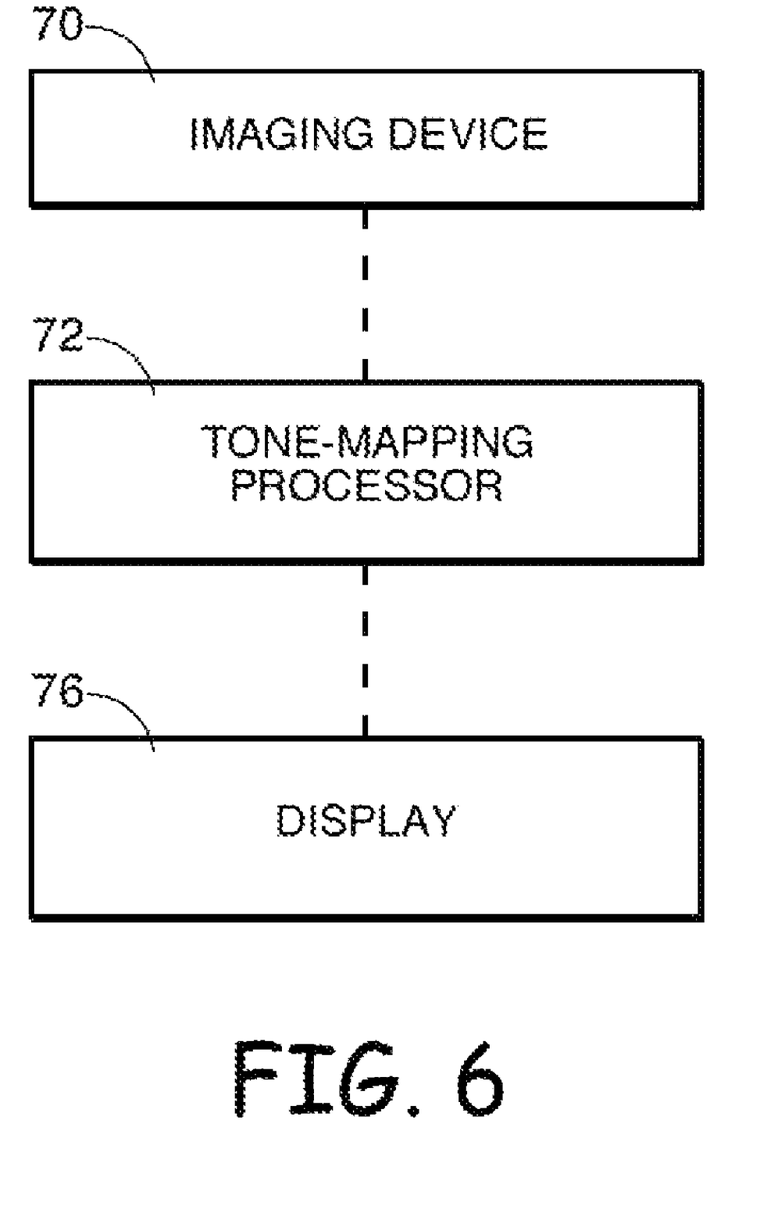
FIG. 6 is a diagram of a tone-mapping processor in accordance with an embodiment of the present invention.

A processing system that may be used in the adaptive local tone-mapping of FIGS. 1-5 is shown in FIG. 6. Tone-mapping processor 72 may also be known as an adaptive local tone-mapping processor. Tone-mapping processor 72 may perform tone-mapping 14 of FIG. 1 and perform adaptive local tone-mapping as shown in FIG. 3. Tone-mapping processor 72 may compute and use sharpening signal $F_s$ as shown in FIG. 4 and sharpening strength $\alpha(F_s)$ as shown in FIG. 5.

Imaging device 70 of FIG. 6 may capture an image of real-world scene 10 of FIG. 1. Imagine device 70 may capture high dynamic range image 12 of FIG. 1. High dynamic range 12 may also be known as a captured image or an input image such as input image I of FIG. 3. Tone-mapping processor 72 may receive the captured image from imaging device 70 via, e.g., a wired computer network, a wireless computer network, connecting cables or transferred on a storage medium. If desired, tone-mapping processor 72 may be incorporated into imaging device 70. If desired, tone-mapping processor 72 may be located on one or more chips in imaging device 70. Tone-mapping processor 72 may be located on an imaging chip that has an imaging array for imaging device 70. Tone-mapping processor 72 may be located on a chip that receives a captured image from an imaging chip having an imaging array. Tone-mapping engine 72 may receive a captured image over a bus.

A tone-mapped image such as low dynamic range image 16 of FIG. 1 may be displayed on a display such as display 76 of FIG. 76. Display 76 may be a computer monitor, a television, a projector, or any suitable display. Display 76 may display still images or video. Tone-mapping processor 72 may send an image to display 75 over a wired or wireless network, via connecting cables or via a storage medium. If desired, tone-mapping processor 72 may be incorporated in a device that includes display 76. If desired, imaging device 70 may include tone-mapping processor 72 and display 76. For example, a digital camera may include a digital imager, a tone-mapping processor, and an LCD screen.

The adaptive local tone-mapping of FIGS. 1-5 may be hardwired on a chip. Hardware for tone mapping may be known as a tone-mapping processor or tone-mapping chip. A tone-mapping processor may be incorporated with an imaging device or display.

Various embodiments have been described illustrating tone-mapping for converting high dynamic range images to low dynamic range images.

Adaptive local tone mapping may be used to convert a high dynamic range image to a low dynamic range image. Tone mapping may be performed on an input image in the Bayer domain, before the image has been converted to an RGB domain image. Tone-mapping may be performed with a tone-mapping processor. Images may be still images or moving images such as video.

An input image may be received from an imager such as a digital imager. A high dynamic range input image may be filtered to produce a luminance signal. An illumination component of the luminance signal may be compressed. The illumination component may be compressed by log domain contrast mapping and by using an adaptive power function. A reflectance component of the luminance signal may be sharpened. The reflectance component may be sharpened by applying a logarithm function and by applying noise coring. The sharpened reflectance component and the compressed illumination component may be combined to produce a modified luminance signal, also known as a processed or compressed luminance signal.

The input image may be combined with the luminance signal and the modified luminance signal to produce an output image in the Bayer domain. The output image may have an dynamic range that is lower than the dynamic range of the input image.

A gamma function may be applied to the output image. The output image may be demosaiced into an RGB domain image. The output image may be sent to display.

The foregoing is merely illustrative of the principles of this invention which can be practiced in other embodiments.

What is claimed is:

1. A method for tone mapping images with a tone-mapping processor, comprising:

receiving, at a tone-mapping processor, a first image having a Bayer representation and an associated dynamic range;

with the tone-mapping processor, applying a filter to the first image to produce a first luminance signal having an associated dynamic range;

with the tone-mapping processor, tone-mapping the first luminance signal to produce a second luminance signal having an associated dynamic range that is lower than the associated dynamic range of first luminance signal;

with the tone-mapping processor, producing a second image having a Bayer representation using the first and second luminance signals, wherein the second image has an associated dynamic range that is lower than the associated dynamic range of the first image;

with the tone-mapping processor, demosaicing the second image having a Bayer representation to produce a third image having an RGB representation; and at the tone-mapping processor, sending the third image to a display.

2. The method defined in claim 1, wherein tone-mapping the first luminance signal to produce the second luminance signal comprises:

with the tone-mapping processor, producing an illumination component of the first luminance signal;

with the tone-mapping processor, producing a reflectance component of the first luminance signal;

with the tone-mapping processor, compressing the illumination component of the first luminance signal;

with the tone-mapping processor, sharpening the reflectance component of the first luminance signal; and with the tone-mapping processor, combining the sharpened reflectance component of the first luminance signal and the compressed illumination component of the first luminance signal to produce the second luminance signal.

3. The method defined in claim 2, wherein sharpening the reflectance component of the first luminance signal comprises:
with the tone-mapping processor, producing a sharpening signal; and
with the tone-mapping processor, using the sharpening signal to sharpen the reflectance component of the first luminance signal.

4. The method defined in claim 3, wherein producing the sharpening signal comprises:
with the tone-mapping processor, applying a logarithm function to the reflectance component of the first luminance signal to produce a logarithm of the reflectance component; and
with the tone-mapping processor, applying noise coring to the logarithm of the reflectance component to produce the sharpening signal.

5. The method defined in claim 4, wherein applying noise coring to the logarithm of the reflectance component to produce the sharpening signal comprises using a noise coring parameter.

6. The method defined in claim 5, wherein using a noise coring parameter to apply noise coring to the logarithm of the reflectance component comprises:
in a first region of the logarithm of the reflectance component, adding the noise coring parameter to the logarithm of the reflectance component; and
in a second region of the logarithm of the reflectance component, subtracting the noise coring parameter from the logarithm of the reflectance component.

7. The method defined in claim 2, wherein compressing the illumination component of the first luminance signal comprises:
with the tone-mapping processor, applying log domain contrast mapping to the illumination component of the first luminance signal; and
with the tone-mapping processor, applying an adaptive power function to the illumination component.

8. The method defined in claim 7, wherein applying log domain contrast mapping to the illumination component comprises producing a log average of the illumination component.

9. The method defined in claim 7, wherein applying an adaptive power function to the illumination component comprises using a first gamma parameter and a second gamma parameter.

10. The method defined in claim 2, wherein calculating an illumination component of the first luminance signal comprises applying a shape adaptive filter to the first luminance signal.

11. A method for tone-mapping with a tone-mapping processor, comprising:
at a tone-mapping processor, receiving a first Bayer image having a first dynamic range;
with the tone-mapping processor, applying a filter to the first Bayer image to produce a luminance signal;
with the tone-mapping processor, calculating an illumination component of the luminance signal;
with the tone-mapping processor, calculating a reflectance component of the luminance signal;
with the tone-mapping processor, compressing the illumination component of the luminance signal;
with the tone-mapping processor, sharpening the reflectance component of the luminance signal;
with the tone-mapping processor, combining the sharpened reflectance component and the compressed illumination component to produce a tone-mapped luminance signal;
with the tone-mapping processor, using the luminance signal and the tone-mapped luminance signal to produce a second Bayer image having a second dynamic range that is lower than the first dynamic range.

12. The method defined in claim 11, further comprising:
with the tone-mapping processor, applying a gamma function to the second Bayer image.

13. The method defined in claim 12, further comprising:
with the tone-mapping processor, demosaicing the second Bayer image to produce an RGB image; and
sending the RGB image to a display.

14. The method defined in claim 11, wherein sharpening the reflectance component comprises:
with the tone-mapping processor, applying a logarithm function to the reflectance component of the luminance signal to produce a logarithm of the reflectance component;
with the tone-mapping processor, applying noise coring to the logarithm of the reflectance component to produce a sharpening signal; and
with the tone-mapping processor, using the sharpening signal to sharpen the reflectance component of the luminance signal.

15. The method defined in claim 11, wherein compressing the illumination component of the luminance signal comprises:
with the tone-mapping processor, applying log domain contrast mapping to the illumination component of the first luminance signal using a log average of the illumination component; and
with the tone-mapping processor, applying an adaptive power function to the illumination component using a first gamma parameter and a second gamma parameter.

16. A processor-implemented method for tone mapping images with a tone-mapping processor, comprising:
receiving, at a tone-mapping processor, an input Bayer domain image having an input dynamic range;
with the tone-mapping processor, convolving a filter with the input Bayer domain image to produce a luminance signal;
with the tone-mapping processor, tone-mapping the luminance signal to produce a tone-mapped luminance signal;
with the tone-mapping processor, combining the input Bayer domain image with the luminance signal and the tone-mapped luminance signal to produce an output Bayer domain image have an output dynamic range that is lower than the input dynamic range, comprising:
dividing the input Bayer domain image by the luminance signal and multiplying by the tone-mapped luminance signal.

17. The processor-implemented method defined in claim 16 wherein the input and output Bayer domain images comprise still images.

18. The processor-implemented method defined in claim 16, wherein the input and output Bayer domain images comprise video.

19. The processor-implemented method defined in claim 18, further comprising:
producing an illumination component of the luminance signal;

with the tone-mapping processor, applying log domain contrast mapping to the illumination component of the first luminance signal using a log average of the illumination component; and with the tone-mapping processor, applying an adaptive power function to the illumination component using a first gamma parameter and a second gamma parameter.

20. The processor-implemented method defined in claim 19, wherein applying log domain contrast mapping to the illumination component of the first luminance signal comprises selecting log domain contrast mapping parameters from a histogram to reduce video flickering.

* * * * *